W. HARPER.
Brake for Hay-Wagons.

No. 163,653. Patented May 25, 1875.

WITNESSES:
C. Neveux
A. F. Terry

INVENTOR:
William Harper
BY
Munn
ATTORNEYS.

UNITED STATES PATENT OFFICE.

WILLIAM HARPER, OF SENECAVILLE, OHIO.

IMPROVEMENT IN BRAKES FOR HAY-WAGONS.

Specification forming part of Letters Patent No. 163,653, dated May 25, 1875; application filed March 20, 1875.

*To all whom it may concern:*

Figure 1:
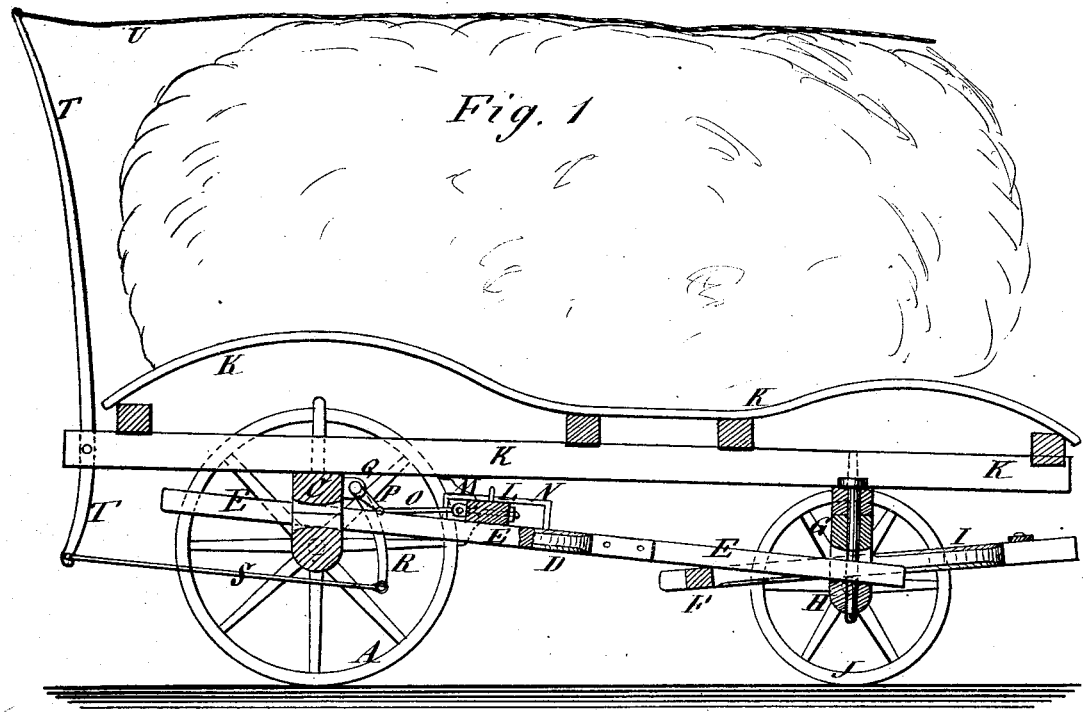
Figure 2:
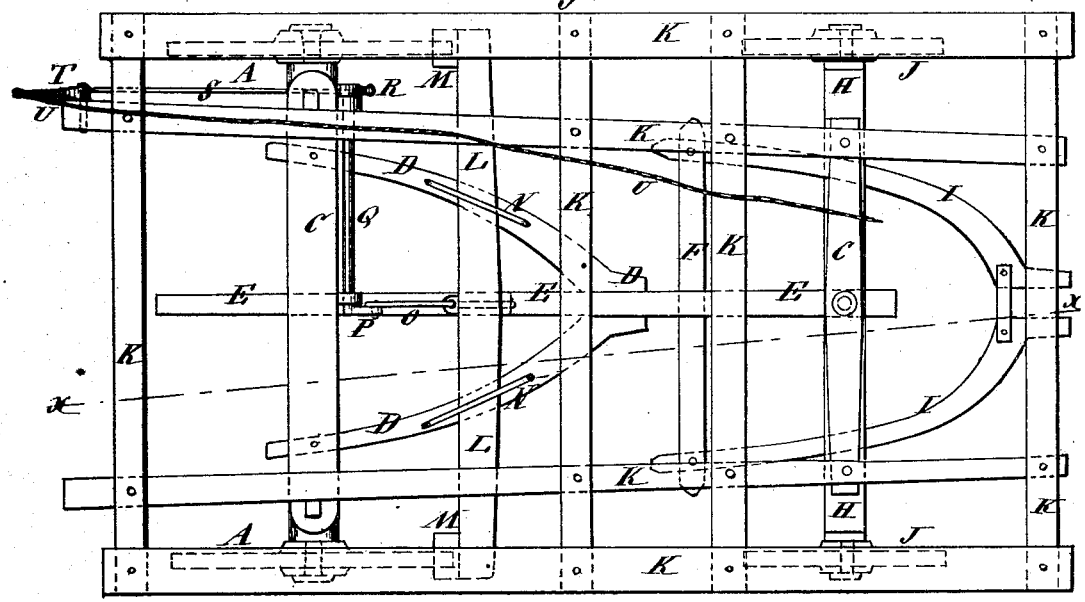

Be it known that I, WILLIAM HARPER, of Senecaville, in the county of Guernsey and State of Ohio, have invented a new and useful Improvement in Brakes for Hay-Wagons, &c., of which the following is a specification:

Figure 1 is a vertical longitudinal section of a wagon-gearing to which my improvement has been applied. Fig. 2 is a top view of the same.

Similar letters of reference indicate corresponding parts.

My improvement in wagon-brakes relates to the construction and arrangement of the operating-lever, whereby it operates automatically to hold the brake-bar away from the wheels, except when applied thereto by manual force, as hereinafter described.

A are the rear wheels. B is the rear axle. C is the rear bolster. D are the hounds. E is the reach. F is the sway-bar. G is the forward bolster. H is the forward axle. I are the forward hounds, and J are the forward wheels, about the construction of which parts there is nothing new. K represents an ordinary hay-rack attached to the wagon-gearing. L is the brake-bar, to the ends of which are attached the brake-shoes M, and which works in keepers N attached to the rear hounds D. To the center of the rear side of the brake-bar L is pivoted the forward end of a short connecting-rod, O, the rear end of which is pivoted to a short crank-arm, P, attached to or formed upon the inner end of a short shaft, Q. The short shaft Q works in bearings attached to the forward side of the rear bolster C, and to its outer end is attached or upon it is formed a downwardly-projecting crank-arm, R, which is made of such a length that its lower end may be a little below the lower side of the rear axle B. To the lower end of the crank-arm R is pivoted the forward end of the rod S, which passes back beneath the rear axle B, and to its rear end is pivoted the lower end of the long lever T. The lever T is pivoted near its lower end to the rack-body K, and its extended upper portion is curved rearward to such an extent that its center of gravity is brought above the pivot or point of support. In consequence of this arrangement said upper end or larger arm of the lever T will always fall to the rearward when no tension is applied to the cord U, and thus move the brake-beam sufficiently to remove the shoes M from the wheels. In other words, the brake is released or unlocked by the automatic operation of the lever T.

What I claim is—

The curved pivoted lever T, in combination with the rear end of the wagon body, the cord U, the rods S O, crank-shaft P Q R, and sliding brake-bar L, whereby the weight of the longer lever-arm keeps the brakes ordinarily from the wheel, all substantially as set forth.

WILLIAM HARPER.

Witnesses:
    J. D. MEEK,
    J. S. ROWLAND.